(12) United States Patent
Shebanow et al.

(10) Patent No.: US 8,019,978 B1
(45) Date of Patent: Sep. 13, 2011

(54) UNIT STATUS REPORTING PROTOCOL

(75) Inventors: Michael C. Shebanow, Saratoga, CA (US); Robert C. Keller, Palo Alto, CA (US); Richard A. Silkebakken, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 686 days.

(21) Appl. No.: 11/837,933

(22) Filed: Aug. 13, 2007

(51) Int. Cl.
*G06F 9/30* (2006.01)
*G06F 9/00* (2006.01)

(52) U.S. Cl. .......................... 712/228; 712/30; 712/220

(58) Field of Classification Search .................... 712/30, 712/220, 228
See application file for complete search history.

(56) References Cited

U.S. PATENT DOCUMENTS

| | | | | |
|---|---|---|---|---|
| 4,257,095 A * | 3/1981 | Nadir | ............................ | 710/119 |
| 5,752,031 A * | 5/1998 | Cutler et al. | .................. | 718/103 |
| 6,223,208 B1 * | 4/2001 | Kiefer et al. | .................. | 718/108 |
| 7,038,719 B2 * | 5/2006 | Hirai | ......................... | 348/231.99 |
| 7,194,644 B2 * | 3/2007 | Durand et al. | ................ | 713/320 |
| 7,366,879 B2 * | 4/2008 | Rodgers et al. | ............... | 712/218 |
| 7,401,331 B2 * | 7/2008 | Leung | ........................... | 717/168 |
| 7,496,921 B2 * | 2/2009 | Mehta | ........................... | 718/108 |
| 7,512,773 B1 * | 3/2009 | Shebanow et al. | ............. | 712/228 |
| 2003/0058348 A1 * | 3/2003 | Hirai | ......................... | 348/222.1 |
| 2005/0055604 A1 * | 3/2005 | Chen | ............................... | 714/13 |
| 2006/0020776 A1 * | 1/2006 | Yoshida | ........................ | 712/235 |
| 2006/0143610 A1 * | 6/2006 | Toader | .......................... | 718/100 |

\* cited by examiner

*Primary Examiner* — Aimee J Li
(74) *Attorney, Agent, or Firm* — Patterson & Sheridan, LLP

(57) ABSTRACT

A unit status reporting protocol may also be used for context switching, debugging, and removing deadlock conditions in a processing unit. A processing unit is in one of five states: empty, active, stalled, quiescent, and halted. The state that a processing unit is in is reported to a front end monitoring unit to enable the front end monitoring unit to determine when a context switch may be performed or when a deadlock condition exists. The front end monitoring unit can issue a halt command to perform a context switch or take action to remove a deadlock condition and allow processing to resume.

20 Claims, 7 Drawing Sheets

UNIT STATUS REPORTING PROTOCOL

BACKGROUND OF THE INVENTION

1. Field of the Invention

Embodiments of the present invention relate generally to context switching and, more particularly, to context switching that employs a unit status reporting protocol.

2. Description of the Related Art

Current graphics processing systems maintain state information for a single processing context. A processing context consists of a complete set of rendering state through the entire graphics pipeline. Many programs running on a CPU will need only one processing context for all their graphics, although some programs might use multiple processing contexts. For example, a program may use one context for each window or one context for graphics and another context to run computing applications on a graphics processor. As more application programs use the graphics processing system to perform graphics processing, it is necessary to switch between the different contexts that correspond to each application program. As the capabilities of the graphics processing systems have increased, the complexity and execution time for the graphics processing programs has also increased. Therefore, the amount of active state information that is maintained within the graphics processing system has also increased.

In order to complete a context switch, the active state information is saved in memory and new state for a different context is loaded into the graphics processing system and processing is resumed using the new state. The time needed to unload and load the active state information reduces the processing throughput since the graphics processing system is unavailable during the unloading and loading operations. In some cases, the unloading and loading operation may take as long as 500 microseconds. When each context requires a small amount of graphics processing, the context switching time may exceed the time spent processing data. Alternatively, the graphics processing pipeline may be drained to idle the pipeline, so that the size of the active state information is minimized. However, some graphic pipelines may be very deep, i.e., have a high latency, and require too long to drain, necessitating a costly active context switch to change to a different context without draining the pipeline.

Accordingly, what is needed in the art is a system and method for improving processing throughput when multiple graphics contexts are processed by reducing the context switching time.

SUMMARY OF THE INVENTION

Processing units are configured to report status to a front end monitoring unit in order to reduce the time needed to perform context switches. The front end monitoring unit issues a halt request in order to change contexts and each of the processing units enters a halted state as soon as possible after receiving the halt request. Each processing unit enters the halted state when the current state within the processing unit can be saved for processing at a later time. Once a processing unit is in the halted state, a context switch may be performed for that processing unit by storing the current state information and loading state information for a different context. The processing units can be configured to enter the halted state quickly and when the current state is small to reduce the time needed to perform the context switch.

The unit status reporting protocol may also be used for debugging and performance monitoring. In particular, any processing unit is in one of five states: empty, active, stalled, quiescent, and halted. The state that a processing unit is in is reported to enable the front end monitoring unit to determine when a context switch may be performed or when a deadlock condition exists that prevents the processing units from processing data.

Various embodiments of a method of the invention for reporting status of a processing unit to a front end monitoring unit include asserting an active status signal from the processing unit to the front end monitoring unit, asserting an empty status signal from the processing unit to the front end monitoring unit, and asserting a stalled status signal from the processing unit to the front end monitoring unit. The active status signal is asserted when inputs are active, outputs are produced, a memory access is pending, or the processing unit is processing data. The empty status signal is asserted when inputs are not active, outputs are not produced, a memory access is not pending, and the processing unit is not processing data. The stalled status signal is asserted from the processing unit to the front end monitoring unit when inputs are active and the processing unit can process the inputs.

Various embodiments of the invention for a computing device configured to process multiple contexts include a front end monitoring unit that is coupled to a processing unit. The processing unit is configured to assert an active status signal from the processing unit to the front end monitoring unit, assert an empty status signal from the processing unit to the front end monitoring unit, and assert a stalled status signal from the processing unit to the front end monitoring unit. The active status signal is asserted when inputs are active, outputs are produced, a memory access is pending, or the processing unit is processing data. The empty status signal is asserted when inputs are not active, outputs are not produced, a memory access is not pending, and the processing unit is not processing data. The stalled status signal is asserted from the processing unit to the front end monitoring unit when inputs are active and the processing unit can process the inputs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
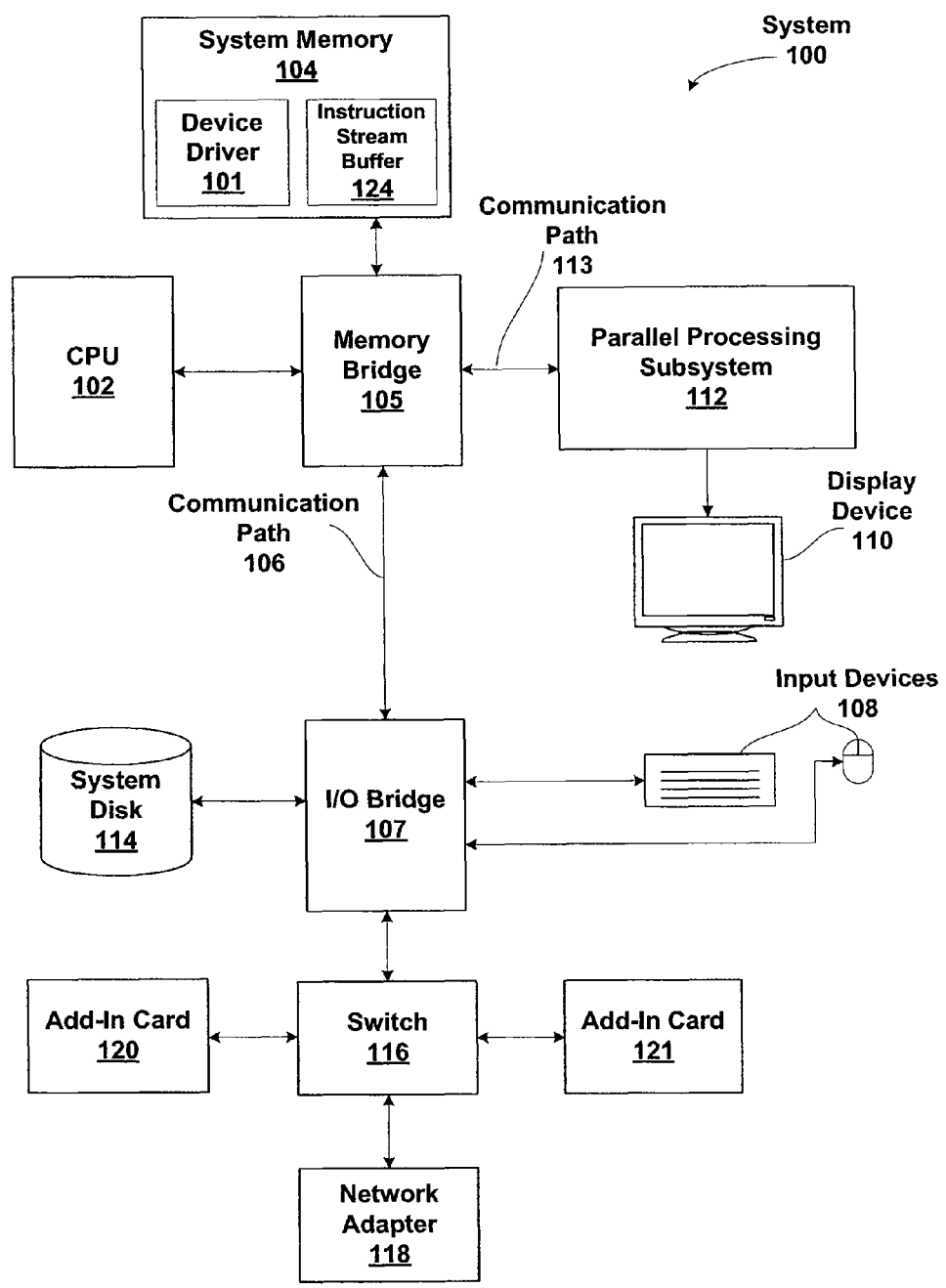
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. System memory 104 includes a device driver 101 that is configured to provide an instruction stream buffer 124 that specifies the location of data and program instructions to parallel processing subsystem 112. The data and program instructions may be stored in system memory 104 or memory within other devices of system 100. Device driver 101 is executed by CPU 102 to translate instructions for execution by parallel processing subsystem 112 based on the specific capabilities of parallel processing subsystem 112. The instructions may be specified by an application programming interface (API) which may be a conventional graphics API such as Direct3D or OpenGL.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
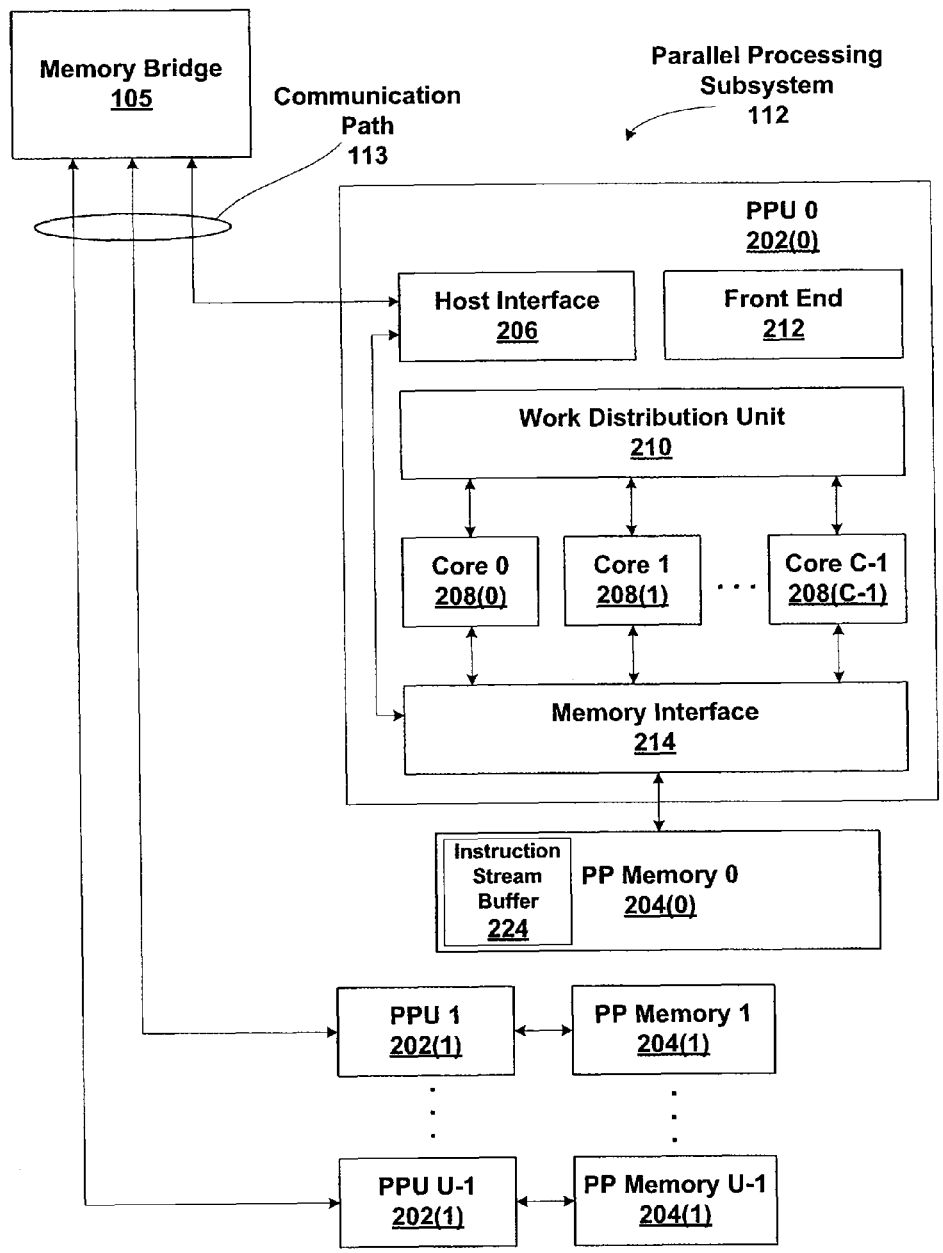
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. An instruction stream buffer 224 that specifies the location of data and program instructions for execution by each PPU 202 may be stored in each PP memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. A processing context encompasses a complete set of state through PPU 202, while a thread may encompass only the state required to shade a single pixel. Threads run inside processing contexts: one processing context might contain thousands of running threads. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by instruction stream buffer 124 via memory bridge 105 and bus 113, interacting with local PP memory 204 (which can be used as graphics memory including, e.g., a conventional frame buffer, instruction stream buffer 224, texture maps, and the like) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1) that is specified by instruction stream buffer 124 or 224, and which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs 202 in a multi-PPU system may be identical to or different from each other; for instance, different PPUs 202 might have different numbers of cores, different amounts of local PP memory, and so on. Where multiple PPUs 202 are present, they may be operated in parallel to process data at higher throughput than is possible with a single PPU 202.

Systems incorporating one or more PPUs 202 may be implemented in a variety of configurations and form factors, including desktop, laptop, or handheld personal computers, servers, workstations, game consoles, embedded systems, and so on.

Core Overview

Figure 3:
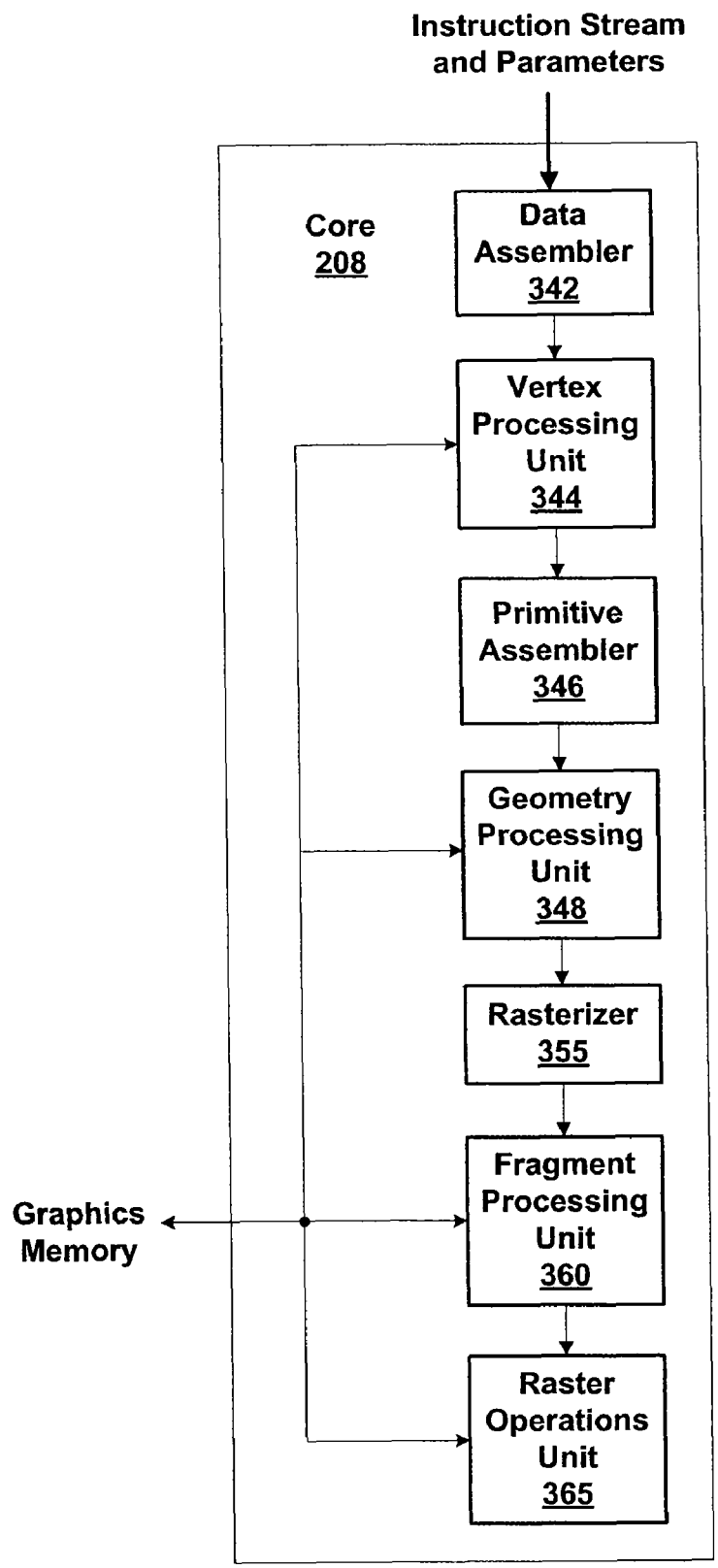
FIG. 3 is a block diagram of the core shown in FIG. 2 configured as a graphics processing pipeline in accordance with one or more aspects of the present invention.

FIG. 3 is a block diagram of core 208 of FIG. 2 that is configured as a graphics processing pipeline, in accordance with one or more aspects of the present invention. Core 208 includes one or more processing units, such as a data assembler 342, vertex processing unit 344, primitive assembler 346, geometry processing unit 348, rasterizer 355, fragment processing unit 360, and raster operations unit 365, that are hereinafter referred to individually as a processing unit. In other embodiments of the present invention, PPU 202 may be configured to form a graphics processing pipeline and cores 208 may be configured to perform the functions of a vertex processing unit 344, geometry processing unit 348, and a fragment processing unit 360. The functions of data assembler 342, primitive assembler 346, rasterizer 355, and raster operations unit 365 may also be performed by core 208 or may be performed by host interface 206.

Data assembler 342 is a fixed function unit that collects vertex data for high-order surfaces, primitives, and the like, and outputs the vertex data to vertex processing unit 344. Vertex processing unit 344 is a programmable execution unit that is configured to execute vertex shader programs, transforming vertex data as specified by the vertex shader programs. For example, vertex processing unit 344 may be programmed to transform the vertex data from an object-based coordinate representation (object space) to an alternatively based coordinate system such as world space or normalized device coordinates (NDC) space. Vertex processing unit 344 may read data that is stored in PP memory 204 through memory interface 214 for use in processing the vertex data.

Primitive assembler 346 receives processed vertex data from vertex processing unit 344 and constructs graphics primitives, e.g., points, lines, triangles, or the like, for processing by geometry processing unit 348. Geometry processing unit 348 is a programmable execution unit that is configured to execute geometry shader programs, transforming graphics primitives received from primitive assembler 346 as specified by the geometry shader programs. For example, geometry processing unit 348 may be programmed to subdivide the graphics primitives into one or more new graphics primitives and calculate parameters, such as plane equation coefficients, that are used to rasterize the new graphics primitives. Geometry processing unit 348 outputs the parameters and new graphics primitives to rasterizer 355. Geometry processing unit 348 may read data that is stored in PP memory 204 through memory interface 214 for use in processing the geometry data.

Rasterizer 355 scan converts the new graphics primitives and outputs fragments and coverage data to fragment processing unit 260. Fragment processing unit 360 is a programmable execution unit that is configured to execute fragment shader programs, transforming fragments received from rasterizer 355 as specified by the fragment shader programs. For example, fragment processing unit 360 may be programmed to perform operations such as perspective correction, texture mapping, shading, blending, and the like, to produce shaded fragments that are output to raster operations unit 365. Fragment processing unit 360 may read data that is stored in PP memory 204 through memory interface 214 for use in processing the fragment data. Memory interface 214 produces read requests for data stored in graphics memory, decompresses any compressed data, and performs texture filtering operations, e.g., bilinear, trilinear, anisotropic, and the like. Raster operations unit 365 is a fixed function unit that optionally performs near and far plane clipping and raster operations, such as stencil, z test, and the like, and outputs pixel data as processed graphics data for storage in graphics memory. The processed graphics data may be stored in graphics memory for display on display device 110.

In a conventional system, in order to switch contexts, each processing unit a graphics processing pipeline is idled after any pending instructions and data are processed and a new context is loaded. Idling all of the processing units in the graphics pipeline take hundreds or thousands of clock cycles. Alternatively, if the current context would take too long to execute and reach an idle point, an active context switch may be performed by unloading the active context and loading the new context. Since the active context state is larger than the idle context state, time needed to switch contexts is longer, but it isn't necessary to reach an idle point. In either case, it is desirable to minimize the number of clock cycles needed to perform the context switch since the latency negatively impacts the interactivity of an application program that uses the graphics processing capability.

The unit status reporting protocol allows each processing unit to transition to a halted state as quickly as possible in order to perform a context switch. The front end monitoring unit issues a halt command and performs the context switch based on the state reported by each processing unit. Reported status may also be used to detect and remove deadlock conditions. For example, when a first processing unit in a pipeline is stalled and unable to output data to a second processing unit, the front end monitoring unit may determine that a deadlock condition exists and reset the processing units. In another example, the first processing unit may be in a quiescent state, waiting to receive more data before initiating processing of data that has been received. When the first processing unit's waiting negatively impacts throughput of the pipeline, the front end monitoring unit may determine that a deadlock condition exists and issue a command to force the first processing unit to resume processing of the data. Therefore, the unit status reporting protocol may be used for various purposes to improve overall processing performance.

Unit Status Reporting and Commands

Figure 4:
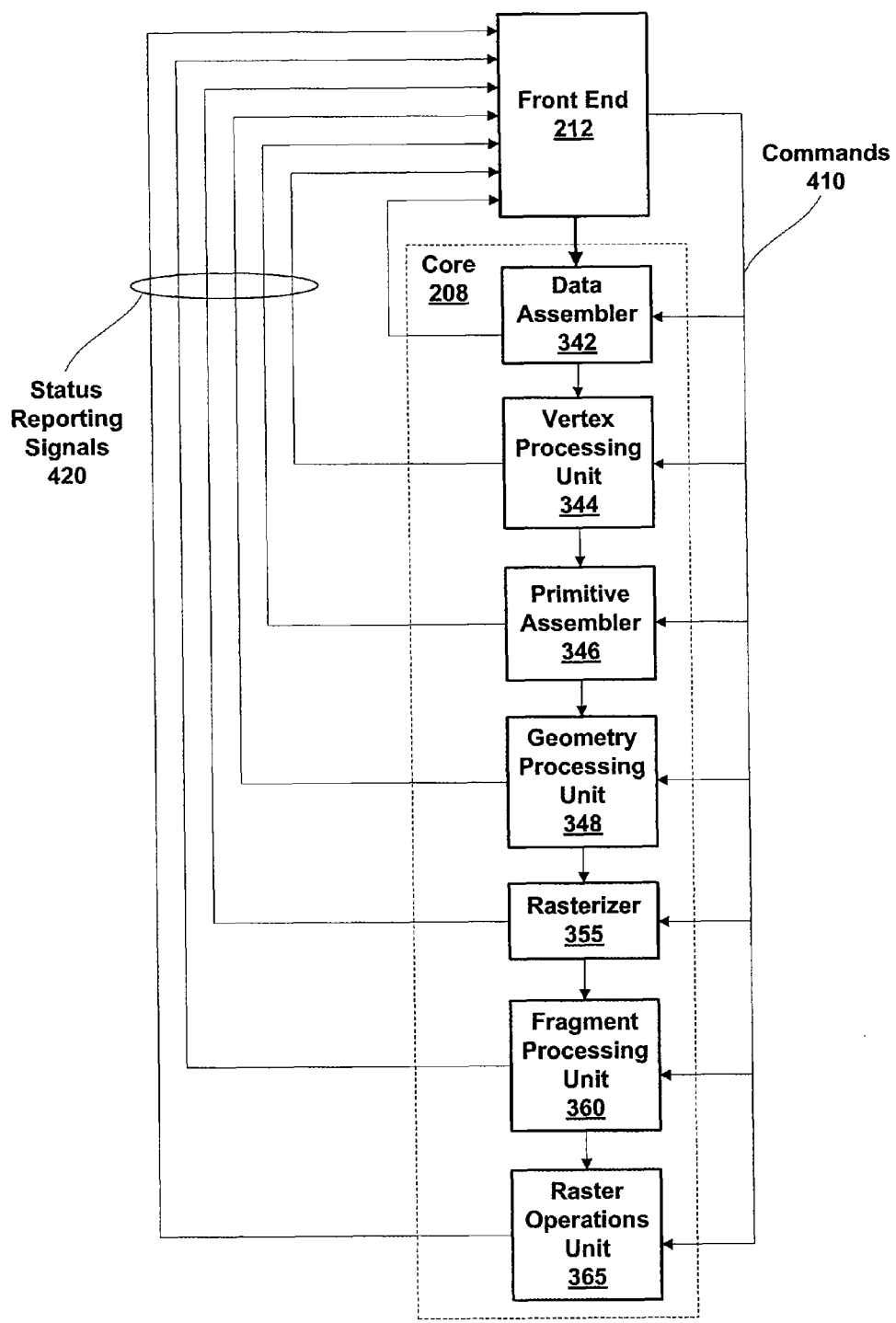
FIG. 4 is a block diagram of a portion of the parallel processing unit shown in FIG. 2 in accordance with one or more aspects of the present invention.

FIG. 4 is a block diagram of a portion of parallel processing unit 202 of FIG. 2, including front end 212 and a core 208, in accordance with one or more aspects of the present invention. FIG. 4 shows connections in parallel processing unit 202 that enable context switching according to an embodiment of the present invention. Some of the other inputs and outputs of core 208 have been omitted from FIG. 4 for clarity. Although a graphics pipeline is illustrated in FIG. 4, the present invention is applicable to other types of pipelines that perform multiprocessing. For example, the present invention is applicable to a pipeline of a central processing unit (CPU) of a computing device.

Each processing unit reports its status to front end 212 through a second connection, status reporting signals 420. A status signal connection included in status reporting signals 420 encodes the state information for a processing unit, indicating the status as empty, active, quiescent, stalled, or halted. The status reporting signals are generated by each processing unit at every clock cycle. Front end 212 monitors the status signals and outputs commands to the processing units to perform context switches or to remove a deadlock condition.

Front end 212 receives a context switch command and initiates the halt sequence in accordance with a halt sequencing protocol. Initially, front end 212 broadcasts a request_to_halt signal to all of the units in the core 208 through a commands 410 connection to issue a halt request. A halt request can be broadcast by generating an active signal and propagating it through commands 410. Other commands that may be issued via commands 410 include a reset command and a resume processing command.

After a halt request has been issued and front end 212 determines that all of the processing units are halted, it continues to issue the halt request command to the processing units through commands 410 to cause each processing unit to remain halted. Thereafter, front end 212 performs the context switch, during which the current state information for each processing unit is stored in memory via memory interface 214, and the state information of another process is retrieved from memory and the retrieved state information is restored to the processing units. In general, the storing and restoring of the state information of the processing units are performed through front end 212, but it is possible for these steps to be carried out directly by the processing units themselves. In some embodiments of the present invention, each processing unit is configured to maintain state information for the current context and store state information for one or more additional contexts.

The connections for status reporting signals 410 and context switch commands 410 preferably have a pipelined distribution tree configuration that includes a number of amplifying stages between front end 212 and each of the processing units. The number of amplifying stages is typically 3 or 4. Larger silicon die areas would require a larger number of amplifying stages.

Status reporting signals 420 and commands 410 may each comprise a multiple number of separate physical connections between front end 212 and the processing units. Each separate physical connection may be implemented as one or more wires, in sufficient number to encode the status of the processing unit as one of the five statuses and to encode the halt request, reset, and resume processing commands. Also, in the preferred embodiment, some processing units roll up or merge its status with the status of one or more other processing units and some do not. This can be done by performing an AND operation on the incoming status signal with its status signal, and transmitting the signal resulting from the AND operation. As a result, the number of separate connections between front end 212 and the processing units is typically, although it does not have to be, greater than 1 and less than N, where N is the number of processing units.

In some embodiments of the present invention, commands 410 is implemented with a separate connection between front end 212 and each processing unit, in order to provide a command to one or more processing units rather than all of the processing units. Separate connections allow for each processing unit to perform a context switch once that processing unit is halted, rather than waiting for all of the processing units to be halted. Additionally, separate connections allow for front end 212 to command a quiescent processing unit to resume processing or to reset one or more of the processing units to eliminate a deadlock condition.

A deadlock condition exists when one or more of the processing units are unable to continue or resume processing inputs, causing the other processing units in the pipeline to also become unable to continue processing inputs. For example, a deadlock condition may exist when a downstream processing unit stalls an upstream processing unit, preventing the upstream processing unit from outputting data. If the stall condition is not removed, a deadlock condition exists. The stall condition may be removed under normal conditions when a memory request is completed, when another downstream unit begins accepting inputs, when processing of inputs completes, when additional inputs are received from another upstream unit, or the like.

A deadlock condition may also exist when a processing unit waits for one or more inputs before initiating processing. A processing unit may be configured to gather several inputs to process the inputs more efficiently, in particular to generate a single memory access rather than generating several smaller memory accesses. When the processing unit holds off processing and remains in a quiescent state waiting for another input the processing unit can cause a deadlock condition. Such a deadlock condition can be identified by examining the unit status reporting signals and it can be removed by issuing a resume processing command to the quiescent processing unit.

Figure 5:
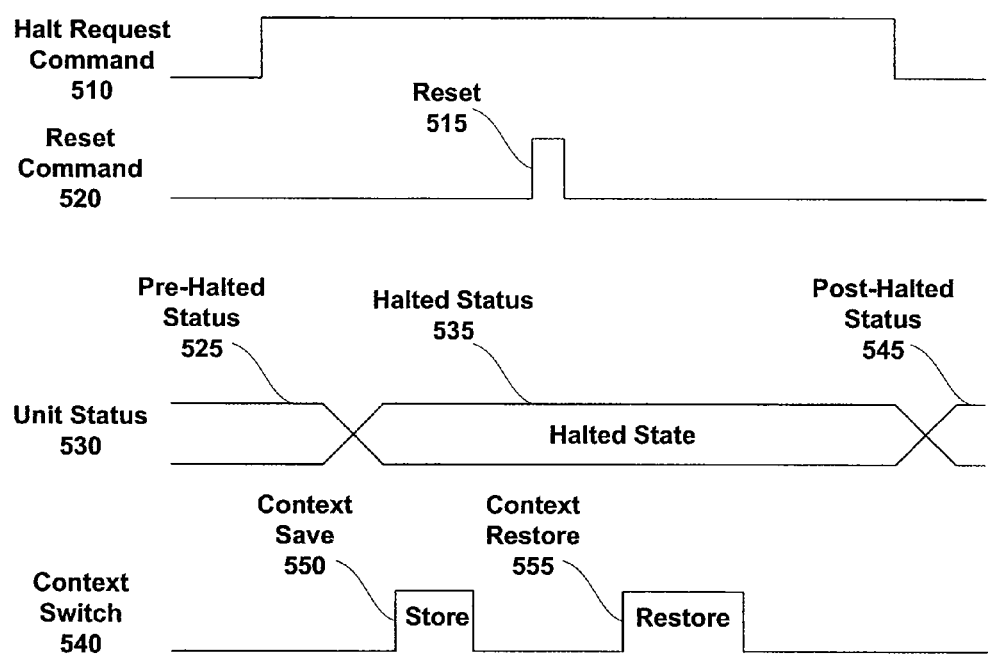
FIG. 5 is a timing diagram of the signals between each processing unit and the front end of FIG. 4 in accordance with one or more aspects of the present invention.

FIG. 5 is a timing diagram of the signals between each processing unit and front end 212 of FIG. 4, in accordance with one or more aspects of the present invention. The signals illustrated in FIG. 5 include a first signal, halt request command 510 and a second signal, reset command 520 that are each transmitted from front end 212 to one or more processing units through commands 410. The unit status reporting signals output from one of the processing units to front end 212 via status reporting signals 420 are shown as signals 530. A waveform of the context switch performed by front end 212, context switch 540, is also shown in FIG. 5 to illustrate the timing of the context switch, in particular the timing of the storing and restoring of the states of the processing units, relative to the signals 510, 520, and 530.

When front end 212 receives a context switch command from the host interface 206, it initiates the halt sequence in accordance with the halt sequencing protocol by broadcasting a halt request command to all of the processing units through commands 410. A halt request command is broadcast to the processing units through commands 410 when halt request command 510 is asserted (changes from a low to a high level). In response to the halt request command, each processing unit proceeds to transition to the halted state as quickly as possible, as described in conjunction with FIG. 6. Unit status 530 indicates the state of one processing unit as a pre-halted status 525. Pre-halted status 525 can be any of the five states, e.g., empty, active, stalled, quiescent, and halted. When the processing unit has transition from pre-halted status 525 to halted status 535, the processing unit is in the halted state and reports that status to front end 212, as shown by halt status 530.

When front end 212 determines that all of the processing units are halted, it maintains the halt request command through commands 410 in order to freeze the current state information of the processing units. Then front end 212 performs the context switch, as shown by context switch 540 waveform. First, the current state information of the processing units is stored in the memory, as shown by context store 550. The current state information may be stored locally within each processing unit or in PP memory 204 or system memory 104.

After the current state information is saved, front end 212 issues a reset command, shown as reset 515 of reset command 520. When the reset command is received by each processing unit, the processing unit resets, clearing any storage resources, e.g., registers, first-in first-out (FIFO) memories, and the like, within the processing units. Once a processing unit is reset, processing cannot resume for the current state since the complete current state information is no longer available.

After the processing unit has been reset, the state information of another context is retrieved from the memory and the processing unit is restored to the retrieved state information, as shown by context restore 555. Once the halt request command is removed, the processing unit enters the state that it was in when the restored context was stored and reports that state to front end 212 as the unit status. When halt request command 510 is negated the processing unit resumes processing of the restored state and reports post-halted status 545 to front end 212.

Figure 6:
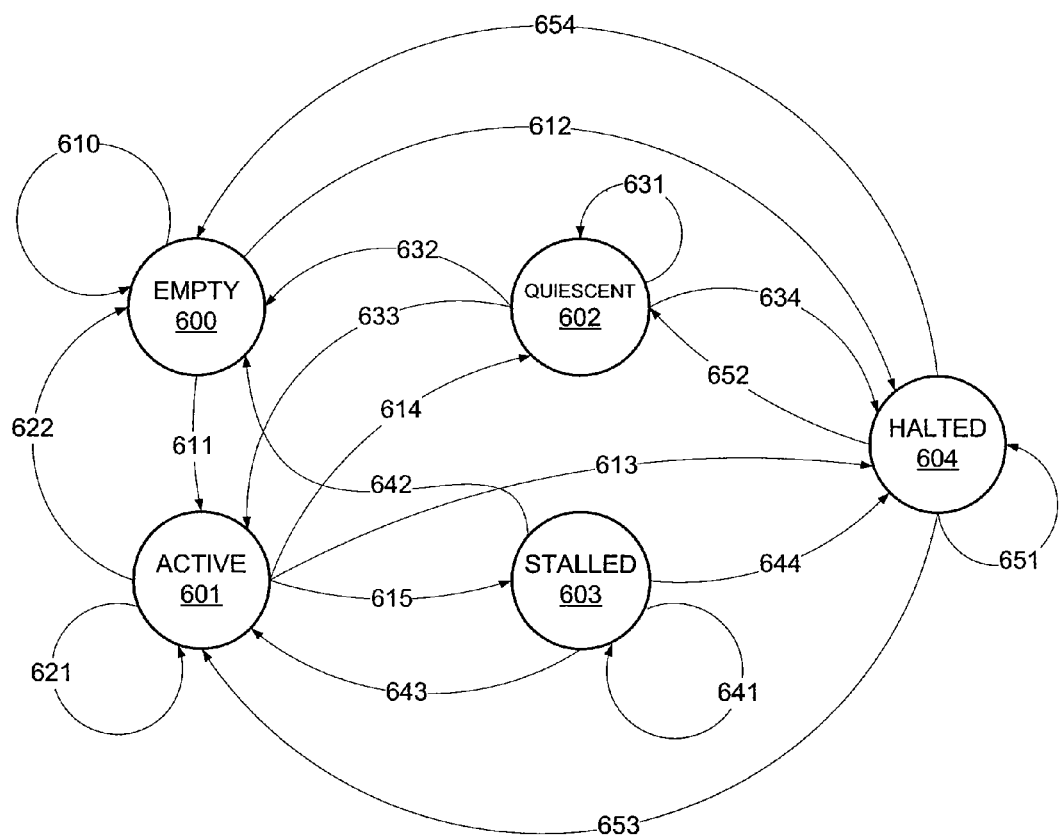
FIG. 6 is a finite state machine diagram for the unit status reporting protocol in accordance with one or more aspects of the present invention.

FIG. 6 is a finite state machine diagram for the unit status reporting protocol, in accordance with one or more aspects of the present invention. As previously described, the finite state machine includes five states, empty 600, active 601, quiescent 602, stalled 603, and halted 604. When a processing unit is in a state, it asserts the corresponding status signal to front end 212. For example, when the processing unit is in empty 600, the empty status signal of status reporting signals 420 is asserted. When the processing unit is in active 601 the active status signal is asserted. When the processing unit is in active 601 the active status signal is asserted. When the processing unit is in quiescent 602 the quiescent status signal is asserted. When the processing unit is in stalled 603 the stalled status signal is asserted. When the processing unit is in halted 604 the halted status signal is asserted. Note, that the various status signals may be encoded rather than provided as individual signals to front end 212.

When a reset command is received a processing unit enters empty 600. Transitions between states are represented by arcs. Arcs 622, 632, 642, and 652 are followed when a reset command is received to transition from another state into empty 600. The processing unit remains in empty 600 by following arc 610 when the inputs to the processing unit are idle and either a halt request is not received or the processing unit cannot halt. The processing unit transitions to halted 604 by following arc 612 when a halt request is received. The processing unit transitions from empty 600 to active 601 by following arc 611 when one or more of the inputs to the processing unit are active (not idle) and either a halt request or reset command is not received.

The processing unit remains in active 601 by following arc 621 when one or more of the inputs are active, the processing unit is processing data, the processing unit is outputting processed data, or a memory access is pending. The memory access may be either a read or write request that has not been completed by either receiving the data or being acknowledged by memory interface 214. The processing unit transitions from active 601 to empty 600 by following arc 622 when the inputs are idle, the processing unit is no longer processing data, no memory access is pending, and no output is produced.

The processing unit transitions from active 601 to stalled 603 by following arc 615 when a unit that receives an output from the processing unit, i.e., a downstream unit, is stalling the processing unit and the processing unit has an output for the unit that is blocking the processing of data. In some embodiments of the present invention, processing units are configured to buffer outputs and several portions of processed data may be queued for output when a receiving unit cannot accept the processed data. In that case, the processing unit enters stalled 603 when the buffer is full, the processing unit has more processed data for output, and the processing unit cannot accept inputs or process any more data until the receiving unit accepts an output.

The processing unit remains in stalled 603 by following arc 641 when the processing unit cannot process data, has processed data for output, and the output of the processed data is blocked. The processing unit transitions from stalled 603 to active 601 by following arc 643 when output of the processed data is no longer blocked or the processing unit is able to resume processing data. The processing unit transitions from stalled 603 to halted 604 by following arc 644 when a halt request command is received and the processing unit can halt. A processing unit can halt when no memory accesses are pending and the state information can be stored without outputting any processed data to another unit and restored at a later time to resume processing the context. The processing unit transitions from active 601 to halted 604 by following arc 613 when a halt request command is received and the processing unit can halt.

The processing unit transitions from active 601 to quiescent 602 by following arc 614 when the inputs are not active and the processing unit has not completed processing of data. The processing unit may be waiting to receive additional inputs in order to continue processing data or may be waiting for a pending memory access to complete. The processing unit also transitions from active 601 to quiescent 602 when memory interface 214 provides a negative acknowledgement (NACK) to the processing unit in response to a memory access request. A NACK may be produced when the processing unit requests an address that is not within the address space allocated to parallel processing subsystem 112.

The processing unit remains in quiescent 602 by following arc 631 when all of the inputs are idle. The processing unit transitions from quiescent 602 to active 601 by following arc 633 when one or more inputs become active. The processing unit transitions from quiescent 602 to halted 604 by following arc 634 when a halt request command is received and the processing unit can halt. The processing unit remains in halted 604 by following arc 651 as long as the halt request command is issued and the reset command is not issued. The processing unit transitions from halted 604 to quiescent 602 by following arc 652 when the halt request command is removed, the processing unit has pending data to process, the inputs are idle, and no outputs are produced. The processing unit transitions from halted 604 to active 601 by following arc 653 when the halt request command is removed and one or more of the following occurs: an input is active; an output is produced; or the processing unit has data that can be processed. The processing unit transitions from halted 604 to empty 600 by following arc 654 when the halt request command is removed, the processing unit has no data to process, and no outputs are produced. In preferred embodiments of the present invention, the processing units are configured to transition into halted state 604 as soon as possible, i.e., within 200 clock cycles.

Figure 7:
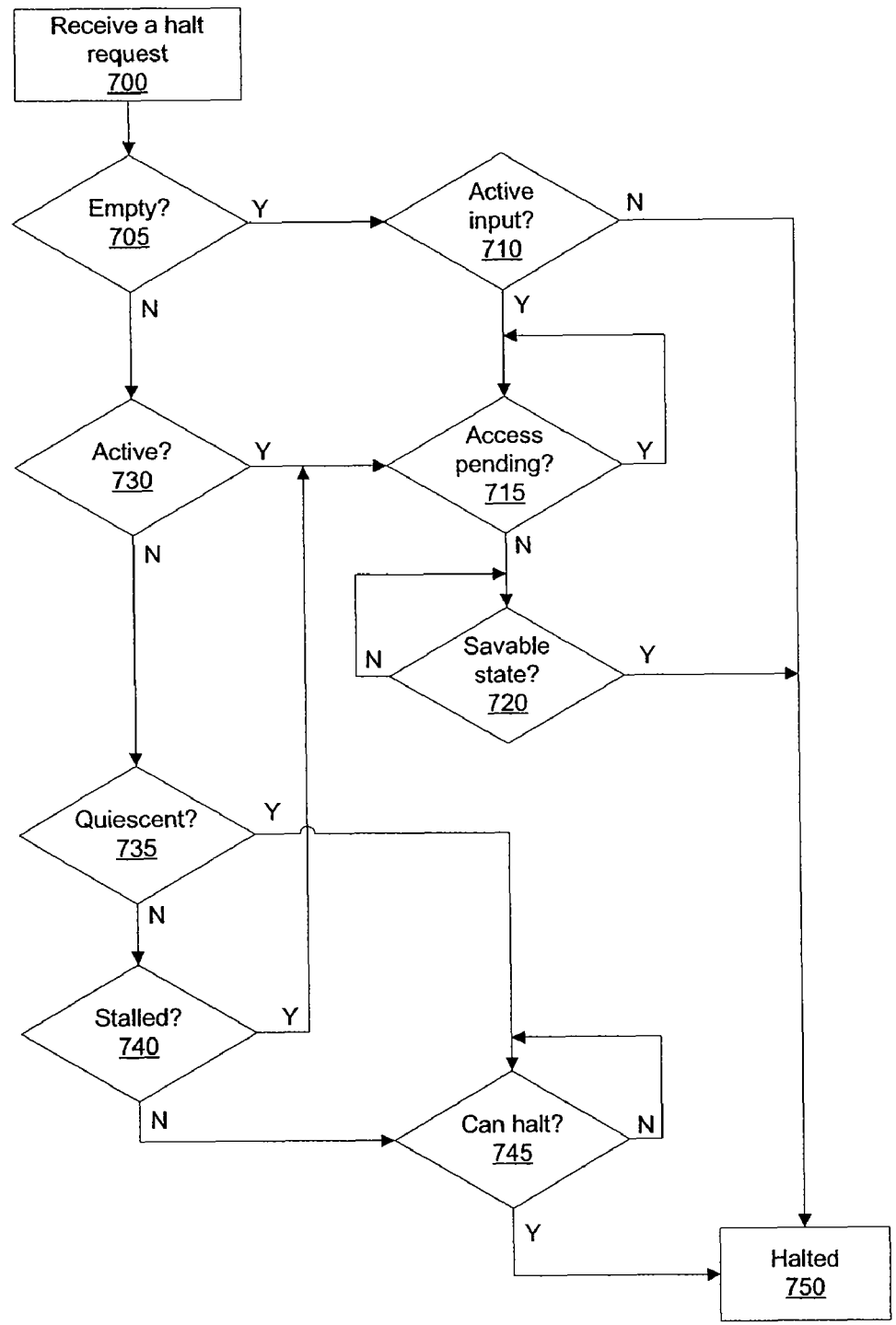
FIG. 7 is a flow diagram of method steps for the unit status reporting protocol in accordance with one or more aspects of the present invention.

FIG. 7 is a flow diagram of method steps for the unit status reporting protocol that follow from the finite state machine of FIG. 6, in accordance with one or more aspects of the present invention. In step 700 a processing unit receives a halt request command from front end 212. Additional processing unit may also receive the halt request command, in which case, each processing unit performs the steps shown in FIG. 7. In step 705 the processing unit determines if it is in empty state 600, and, if so, in step 710 the processing unit determines if one or more of the inputs are active. If, in step 710 the processing unit determines that at least one of the inputs is active, then in step 715 the processing unit determines if a memory access is pending, and if so, the processing unit remains in step 715. Otherwise, in step 720 the processing unit determines if the state information for the current context is savable, and, if not, the processing unit remains in step 720. When the state information for the current context becomes savable, then the processing unit proceeds to step 750 and transitions to state halted 604.

If, in step 710 the processing unit determines that at least one input is not active, then the processing unit proceeds to step 750 and transitions to state halted 604. If, in step 705 the processing unit determines that it is not in state empty 600, then in step 730 the processing unit determines if it is in state active 601, and, if so, the processing unit proceeds to step 715. Otherwise, in step 735 the processing unit determines if it is in state quiescent 602, and, if not, then in step 740 the processing unit determines if it is in state stalled 603. If, in step 740 the processing unit determines that it is in state stalled 603, then the processing unit proceeds to step 715. Otherwise, the processing unit proceeds to step 745. If, in step 735 the processing unit determines that it is in state quiescent 602 then it also proceeds to step 745. In step 745 the processing unit determines if it can halt, and, if not, the processing unit remains in step 745. Otherwise, the processing unit proceeds to step 750 and transitions to state halted 604.

Once a processing unit is in halted 604, the current context being executed by the processing unit and represented by the current state information can be stored in memory. State information pertaining to a different context to be executed after the context switch are read from memory and the processing unit is restored with the state information read from the memory. Therefore, the halt state, halted 604 is useful to allow the processing units to context switch efficiently, i.e., quickly and when the amount of memory needed to store the active state information for a context is minimized. Furthermore, inclusion of a quiescent state, quiescent 602 ensures that a processing unit that is not active while waiting for additional inputs or a pending memory accesses is not mistakenly assumed to be empty by front end 212. The stalled state, stalled 603 allows for front end 212 (and software via device driver 101) to determine if one or more of the processing units are deadlocked. Front end 212 may be configured to removed the deadlock conditions and allow processing to resume.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for reporting status of a processing unit to a front end monitoring unit, comprising:
   asserting an active status signal from the processing unit to the front end monitoring unit when inputs are active, outputs are produced, a memory access is pending, or the processing unit is processing data;
   asserting an empty status signal from the processing unit to the front end monitoring unit when inputs are not active, outputs are not produced, a memory access is not pending, and the processing unit is not processing data; and
   asserting a stalled status signal from the processing unit to the front end monitoring unit when inputs are active and the processing unit can process the inputs.

2. The method of claim 1, further comprising the step of asserting a quiescent status signal from the processing unit to the front end monitoring unit when first inputs are received and the processing unit needs second inputs to begin processing.

3. The method of claim 1, further comprising the step of issuing a halt request from the front end monitoring unit to the processing unit to perform a context switch.

4. The method of claim 3, further comprising the step of asserting a halt status signal from the processing unit to the front end monitoring unit when the processing unit has completed processing of the halt request and is configured to store current state information and load new state information for the context switch.

5. The method of claim 4, wherein the processing unit transitions from an empty state to a halt state when the halt request is received.

6. The method of claim 4, wherein the processing unit transitions from an empty state to a halt state when no memory access is pending and current state information is savable for the context switch.

7. The method of claim 4, wherein the processing unit transitions from an active state to a halt state when no memory access is pending and current state information is savable for the context switch.

8. The method of claim 4, wherein the processing unit transitions from a quiescent state to a halt state when the processing unit can halt for the context switch.

9. The method of claim 4, wherein the processing unit transitions from a stalled state to a halt state when no memory access is pending and current state information is savable for the context switch.

10. The method of claim 1, further comprising the steps of:
    determining that a deadlock condition exists that prevents the processing unit from transitioning out of a stalled state; and
    issuing a reset command from the front end monitoring unit to the processing unit to remove the deadlock condition.

11. The method of claim 1, further comprising the steps of:
    determining that a deadlock condition exists that prevents the processing unit from transitioning out of a quiescent state; and
    issuing a command from the front end monitoring unit to the processing unit to force the processing unit to transition from the quiescent state to an active state and resume processing.

12. A computing device configured to process multiple contexts, the computing device comprising:
    a front end monitoring unit; and
    a processing unit coupled to the front end monitoring unit and configured to:
       assert an active status signal from the processing unit to the front end monitoring unit when inputs are active, outputs are produced, a memory access is pending, or the processing unit is processing data;
       assert an empty status signal from the processing unit to the front end monitoring unit when inputs are not active, outputs are not produced, a memory access is not pending, and the processing unit is not processing data; and
       assert a stalled status signal from the processing unit to the front end monitoring unit when inputs are active and the processing unit can process the inputs.

13. The system of claim 12, wherein the processing unit is further configured to assert a quiescent status signal from the processing unit to the front end monitoring unit when first inputs are received and the processing unit needs second inputs to begin processing.

14. The system of claim 12, wherein the front end monitoring unit is configured to issue a halt request to the processing unit to perform a context switch to halt processing of a first context and begin processing of a second context.

15. The system of claim 14, wherein the processing unit is further configured to assert a halt status signal from the processing unit to the front end monitoring unit when the processing unit has completed processing of the halt request and is configured to store current state information and load new state information for the context switch.

16. The system of claim 14, wherein the processing unit is further configured to transition from an empty state to a halt state when the halt request is received.

17. The system of claim 14, wherein the processing unit is further configured to transition from an empty state to a halt state when no memory access is pending and current state information is savable for the context switch.

18. The system of claim 14, wherein the processing unit is further configured to transition from an active state to a halt state when no memory access is pending and current state information is savable for the context switch.

19. The system of claim 12, wherein the processing unit is further configured to generate pixel data that is suitable for display from graphics data provided as the inputs to the processing unit.

20. The system of claim 12, wherein the processing unit is further configured to concurrently process data for multiple threads.

* * * * *